United States Patent
Ray

(10) Patent No.: US 8,514,844 B2
(45) Date of Patent: Aug. 20, 2013

(54) SYSTEM, METHOD AND APPARATUS FOR PROVIDING SIMULATED STUTTER DIAL TONE FROM AN IP END POINT DEVICE

(75) Inventor: Amar Nath Ray, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 876 days.

(21) Appl. No.: 12/363,568

(22) Filed: Jan. 30, 2009

(65) Prior Publication Data

US 2010/0195541 A1   Aug. 5, 2010

(51) Int. Cl.
*H04L 12/66* (2006.01)

(52) U.S. Cl.
USPC ............................ 370/352; 370/389; 370/401

(58) Field of Classification Search
None
See application file for complete search history.

(56) References Cited

U.S. PATENT DOCUMENTS

| | | | | |
|---|---|---|---|---|
| 5,363,431 A | * | 11/1994 | Schull et al. | 379/88.12 |
| 5,521,964 A | * | 5/1996 | Schull et al. | 379/88.12 |
| 6,335,963 B1 | * | 1/2002 | Bosco | 379/88.12 |
| 6,987,962 B1 | * | 1/2006 | McConnell | 455/413 |
| 7,477,729 B2 | * | 1/2009 | Bell | 379/88.12 |
| 7,738,636 B1 | * | 6/2010 | Wageman et al. | 379/88.12 |
| 7,978,830 B2 | * | 7/2011 | O'Neill | 379/88.14 |
| 2005/0111632 A1 | * | 5/2005 | Caputo et al. | 379/88.16 |
| 2006/0262912 A1 | * | 11/2006 | Caputo et al. | 379/88.19 |
| 2007/0115936 A1 | * | 5/2007 | Newton | 370/352 |
| 2007/0116197 A1 | * | 5/2007 | O'Neill | 379/67.1 |

* cited by examiner

*Primary Examiner* — Bob Phunkulh
(74) *Attorney, Agent, or Firm* — Patton Boggs LLP

(57) ABSTRACT

An embodiment of a method for providing a simulated stutter dial tone includes receiving a new voicemail notification message at a packet-based telephony device. The new voicemail notification message indicates that a new voicemail message is waiting in a voicemail box associated with a user of the packet-based telephony device. The method further includes detecting an off-hook status of the packet-based telephony device, and generating a simulated stutter dial tone signal by the packet-based telephony device in response to receiving the new voicemail notification message and detecting the off-hook status. The method further includes providing the simulated stutter dial tone signal to an audio reproduction device.

20 Claims, 5 Drawing Sheets

SYSTEM, METHOD AND APPARATUS FOR PROVIDING SIMULATED STUTTER DIAL TONE FROM AN IP END POINT DEVICE

BACKGROUND OF THE INVENTION

Network voicemail systems are capable of offering voicemail services to hundreds or thousands of customers. Voicemail services allow voice messages to be stored for later retrieval by subscribing customers. Each customer is assigned a voicemail box having an associated box number and passcode. Using the passcode, the customer can access the voicemail box to listen to voicemail messages or administer the voice mail box. In a traditional a public switched telephone network (PSTN), the serving telephone company's central office (CO) switch may apply a special dial tone to the customer's line when it is taken off-hook to indicate that a new message is waiting in the customer's voicemail mailbox. The special dial tone is called a Stutter Dial Tone (SDT). SDT is similar to a regular dial tone except that is cadenced initially, typically for about two seconds, followed by a continuous dial tone. The SDT gives an audible indication to the customer that one or more voicemail messages are waiting in the customer's voicemail box.

BRIEF SUMMARY OF THE INVENTION

An embodiment of a method for providing a simulated stutter dial tone includes receiving a new voicemail notification message at a packet-based telephony device. The new voicemail notification message indicates that a new voicemail message is waiting in a voicemail box associated with a user of the packet-based telephony device. The method further includes detecting an off-hook status of the packet-based telephony device, and generating a simulated stutter dial tone signal by the packet-based telephony device in response to receiving the new voicemail notification message and detecting the off-hook status. The method further includes providing the simulated stutter dial tone signal to an audio reproduction device.

An embodiment of a packet-based telephony device includes a memory, and at least one processor. The at least one processor is configured to retrieve computer-readable instructions from the memory and execute the computer-readable instructions so as to receive a new voicemail notification message at the packet-based telephony device. The new voicemail notification message indicates that a new voicemail message is waiting in a voicemail box associated with a user of the packet-based telephony device. The packet-based telephony device further includes a hook status detector configured to detect an off-hook status of the packet-based telephony device. The packet-based telephony device further includes a simulated stutter dial tone generator module configured to generate a simulated stutter dial tone signal in response to the receiving of the new voicemail notification message and the detecting the off-hook status. The packet-based telephony device still further includes an audio reproduction device configured to receive the simulated stutter dial tone signal.

An embodiment of a computer usable program product in a computer-readable medium stores computer executable instructions that, when executed, cause at least one processor to receive a new voicemail notification message at a packet-based telephony device. The new voicemail notification message indicates that a new voicemail message is waiting in a voicemail box associated with a user of the packet-based telephony device. The computer executable instructions further cause the at least one processor to detect an off-hook status of the packet-based telephony device, generate a simulated stutter dial tone signal in response to receiving the new voicemail notification message and detecting the off-hook status, and provide the simulated stutter dial tone signal to an audio reproduction device.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

When using a packet-based telephony device, such as an Internet Protocol (IP) phone or other IP endpoint device for voice-over IP (VoIP) telephone service, a central office is not typically able to transmit a stutter dial phone to a user's packet-based telephony device over a packet-based network in order to give an audible indication to the user that the user has a new voicemail message waiting in the user's voicemail box in a network voicemail system. In various embodiments, a packet-based telephony device is provided with a simulated stutter dial tone generator module. Upon receiving a notification message from a voicemail system indicating that the user associated with the packet-based telephony device has one or more new voicemail messages waiting, the packet-based telephony device stores this status in a memory. When the packet-based telephony device enters an off-hook state, such as by the user picking up a receiver of the packet-based telephony device, the simulated stutter dial tone generator module generates a simulated stutter dial tone signal and provides the simulated stutter dial tone signal to a speaker or other audio reproduction device. Accordingly, the user of the packet-based telephony device is given an audible indication that the user has one or more new voicemail messages waiting at the voicemail system.

Figure 1:
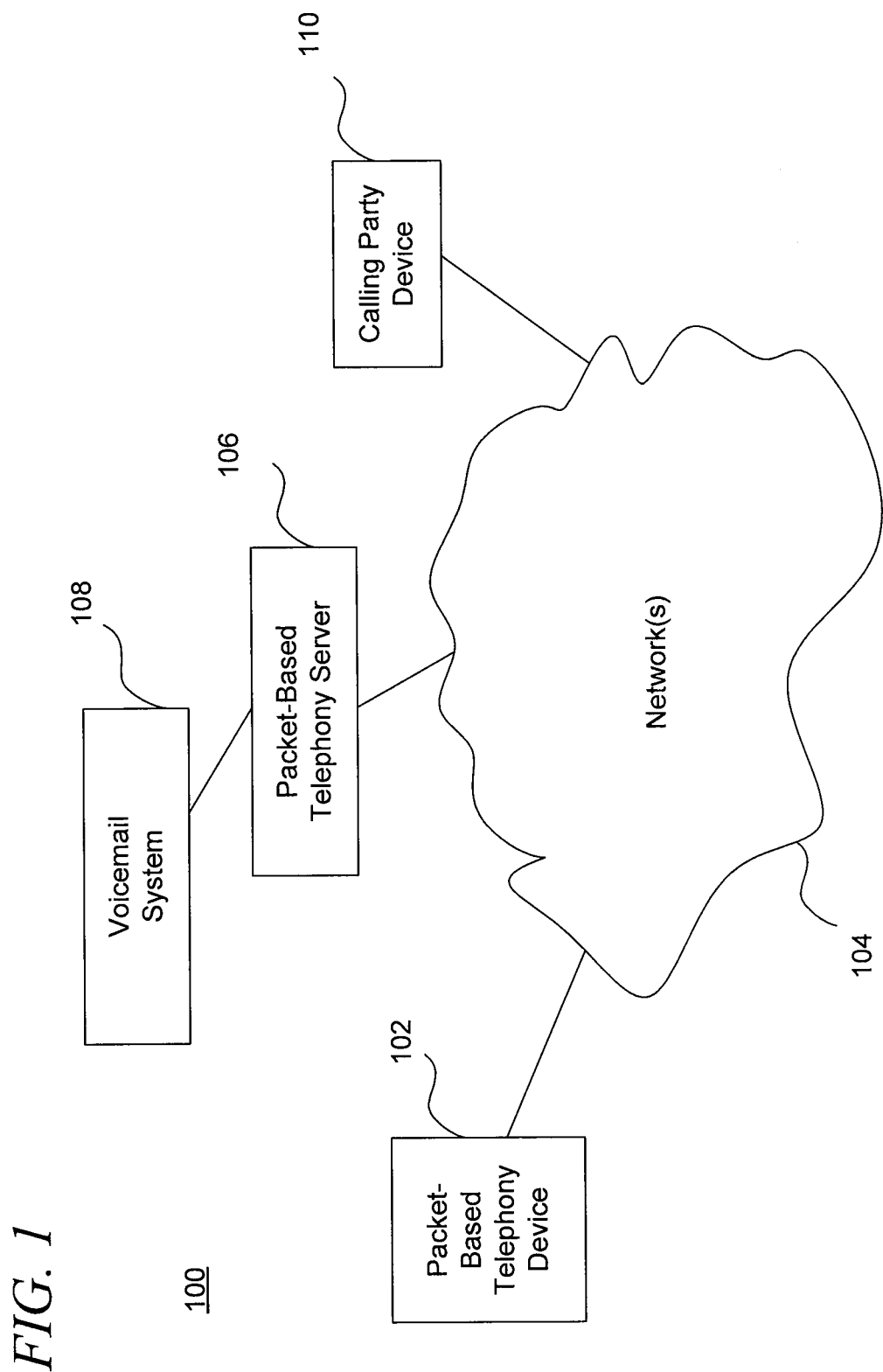
FIG. 1 is an embodiment of a system for providing a simulated stutter dial tone from a packet-based telephony device.

FIG. 1 is an embodiment of a system 100 for providing a simulated stutter dial tone from a packet-based telephony device 102. The system 100 includes a packet-based telephony device 102, network(s) 104, packet-based telephony server 106, voicemail system 108, and calling party device 110. The packet-based telephony device 102 allows telephone calls to be initiated and received over a packet-based network. In a particular embodiment, the packet-based telephony device 102 is an internet protocol (IP) phone. In various embodiments, the packet-based telephony device 102 may be a hardware-based IP phone, a software-based IP phone, or a combination of a hardware-based and software-based IP phone. The packet-based telephony device 102 is in communication with network(s) 104. In at least one embodiment, network(s) 104 includes one or more packet-based networks, such as the Internet. In alternative embodiments, network(s) 104 may include a packet-based network and one or more of any other network type. The network(s) 104 is in communication with the packet-based telephony server 106. In a particular embodiment, the packet-based telephony server 106 is configured to provide packet-based telephony services to one or more packet-based telephony devices, such as packet-based telephony device 102. In various embodiments, packet-based telephony services include the ability to receive incoming phone calls and to initiate outgoing phone calls. The packet-based telephony server 106 is in communication with the voicemail system 108. The voicemail system 108 is configured to provide voicemail services to the packet-based telephony device 102 via the packet-based telephony server 106. In at least one embodiment, the voicemail system 108 is a network voicemail system. In a particular embodiment, the voicemail system 108 includes a voicemail box associated with a user of the packet-based telephony device 102. The voicemail box is configured to store one or more voicemail messages left from calling parties for the user of the packet-based telephony device 102. The network(s) 104 is in further communication with the calling party device 110. The calling party device 110 is a telecommunication device, such as a telephone, configured to initiate telephone calls to other telecommunication devices. In various embodiments, the calling party device 110 may be a an analog telephone, a digital telephone, a wireless phone, an IP phone, or a personal computer.

In one embodiment of an operation of the system 100, a caller using calling party device 110 leaves a new voicemail message in the voicemail box associated with the user of the packet-based telephony device 102. In one embodiment, the calling party device 110 places a call to the packet-based telephony device 102 that is not answered within a predetermined number of rings. The call is forwarded to the voicemail system 108. In another embodiment, a call placed to the packet-based telephony device 102 by calling party device 110 receives a busy signal, and the call is then forwarded to the voicemail system 108. In such embodiments, the caller using the calling party device 110 is prompted to leave a voicemail message for the user of the packet-based telephony device 102, the voicemail message is recorded by the voicemail system 108, and the voicemail system 108 stores the voicemail message in the voicemail box associated with the user of the packet-based telephony device 102. In another embodiment, the calling party may forward or place a voicemail message in the user's voicemail box directly using the voicemail system 108 without first placing a call to the packet-based telephony device 102.

In at least one embodiment, the voicemail system 108 sends a new voicemail notification message to the packet-based telephony device 102 over the network(s) 104 in response to the new voicemail message being stored in user's voicemail box of the voicemail system 108. The new voicemail notification message indicates to the packet-based telephony device 102 that the new message is waiting for the user of the packet-based telephony device 102 in the user's voicemail box of the voicemail system 108. The packet-based telephony device 102 stores the new voicemail message status information in a memory. Upon detecting an off-hook status of the packet-based telephony device 102, the packet-based telephony device generates a simulated stutter dial tone signal and provides the simulated stutter dial tone signal to the user of the packet-based telephony device 102 as an audible indication that the user has one or more new voicemail messages. In a particular embodiment, the packet-based telephony device 102 detects an off-hook status when a handset of the packet-based telephony device is removed from a cradle. In at least one embodiment, the simulated stutter dial tone signal mimics a stutter dial tone as generated by a central office in a PSTN phone system. In various embodiments, the simulated stutter dial tone signal is similar to a regular dial tone except that it is cadenced (or stuttered) initially for a predetermined time period, followed by a continuous normal dial tone. In at least one embodiment, a normal dial tone is a continuous signal having a first tone frequency of 350 Hz and a second tone frequency of 440 Hz. In a particular embodiment, the simulated stutter dial tone signal is cadenced for approximately two seconds before a normal dial tone is generated. In some embodiments, the packet-based telephony device 102 may further turn on a voice message waiting indicator on the packet-based telephony device 102 to indicate that a voicemail message is waiting for the user. In an example embodiment, the voice message waiting indicator may be a steady or blinking light or LED indicating that a single or multiple voicemail messages are waiting in the voicemail system 108 for the user. In still other embodiments, the voice message waiting indicator may be an LCD display having an indication of a number of waiting voicemail messages. An advantage offered by at least one embodiment of the packet-based telephony device 102, is that a user with partial or complete visual disability may be made aware that one or more voicemail messages are waiting in the voicemail system 108 for the user without requiring the user to view a voicemail message waiting indicator.

Upon the user of the packet-based telephony device 102 accessing the voicemail stored in the voicemail system 108, the voicemail system 108 sends a voicemail status change notification message to the packet-based telephony device 102 indicating that no new messages are waiting for the user in the voicemail box of the voicemail system 108. Upon receiving the voicemail status change notification message, the packet-based telephony device 102 stores the updated voicemail status in the memory. When an off-hook status of the packet-based telephony device 102 is again detected, a simulated stutter dial tone signal is not generated and the normal dial tone is presented to the user. By the absence of the simulated stutter dial tone and presence of the normal dial tone, the user is given an audible indication that no new voicemail messages are waiting in the voicemail system 108.

The parameters of the simulated stutter dial tone signal generated by the packet-based telephony device 102 may have any desired number of tones, tone frequencies, cadence, or number of cycles. In a particular embodiment, the simulated stutter dial tone signal may have the following parameters:

TABLE 1

SIMULATED SDT PARAMETERS

| | |
|---|---|
| Frequencies | 350 Hz + 440 Hz with ± 0.7% tolerance on each frequency |
| Signal Power | −20 dBm per tone |
| Twist | ±2 dB maximum between tones |
| Simulated SDT Cadence Timing | 120 ms ± 10 ms on/off |
| Simulated SDT One + Off Cycles | ≧5 One + Off Cycles |

In the embodiment described in Table 1, the simulated dial tone signal includes a first tone having a frequency of approximately 350 Hz and a second tone having a frequency of approximately 440 Hz. In a particular embodiment, the first tone and the second tone are generated substantially simultaneously. In the particular embodiment of Table 1, each of the first tone and the second tone have a signal power of at least −20 dBm. In the particular embodiment illustrated in Table 1, the twist between the first tone and the second tone is ±2 dBm. Twist refers to a difference in signal power between the first tone and second tone. The simulated stutter dial tone signal of Table 1 has a cadence timing of 120 ms±10 ms on/off. In other words, each on/off cycle of the simulated stutter dial tone signal of Table 1 last for approximately 120 ms. In the embodiment of Table 1, the simulated stutter dial tone signal is generated for at least five on/off cycles after detection of an off-hook status of the packet-based telephony device 102. Although a particular embodiment of the simulated stutter dial tone signal is illustrated by Table 1, it should be understood that the simulated stutter dial tone signal may include any desired parameters including the number of tones and desired duration.

Figure 2:
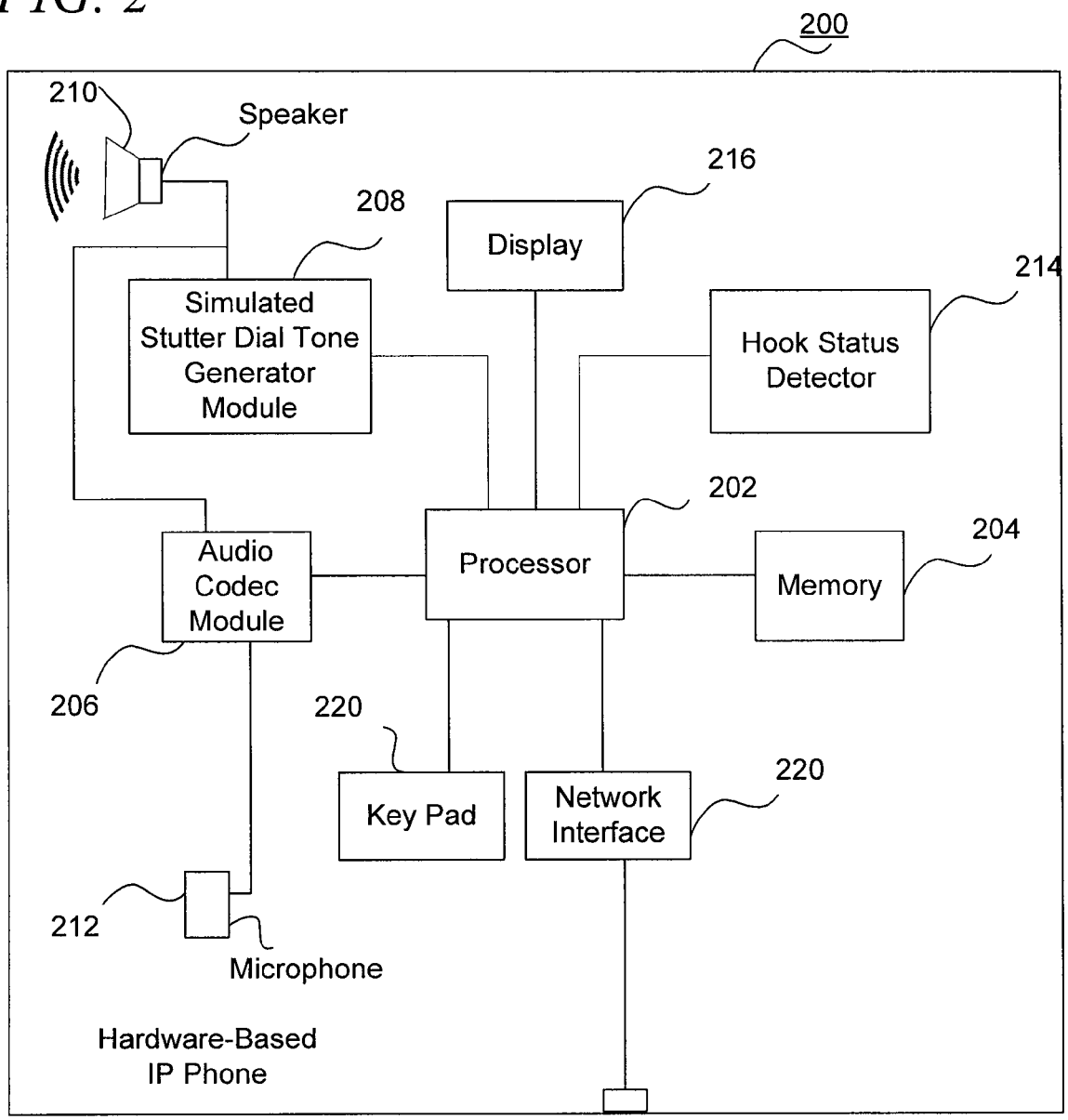
FIG. 2 is an embodiment in which the packet-based telephony device is a hardware-based IP phone.

FIG. 2 is an embodiment in which the packet-based telephony device 102 is a hardware-based IP phone 200. The IP phone 200 includes a processor 202, a memory 204, an audio codec module 206, a simulated stutter dial tone generator module 208, a speaker 210, and a microphone 212. The IP phone 200 further includes a hook status detector 214, a display 216, a network interface 218, and a keypad 220. The processor 202 is in communication with the memory 204, the audio codec module 206, the simulated stutter dial tone generator dial tone generator module 208, the display 216, the hook status detector 214, the network interface 218, and the keypad 220. The audio codec module 206 is in further communication with the speaker 210 and the microphone 212. The simulated stutter dial tone generator module 208 is in further communication with the speaker 210.

In at least one embodiment, the processor 202 is configured to retrieve computer-readable instructions from the memory 204 and execute the computer-readable instructions to perform various functions of the IP phone 200, as described herein. The audio codec module 206 is configured to receive an analog audio input from the microphone 212, convert the analog audio input to a digital audio input, encode the digital audio input according to a particular encoding method or standard, and provide the encoded audio signal to the processor 202. The audio codec module 206 is further configured to receive an encoded digital audio signal from the processor 202, decode the encoded digital audio signal, convert the decoded digital audio signal to an analog audio signal, and provide the analog audio signal to the speaker 210. The network interface 218 is configured to connect the IP phone 200 to the network(s) 104. Upon receiving a notification message indicating that a new voicemail message is waiting in a voicemail box associated with a user of the IP phone 200 via the network interface 218, the processor 202 stores the new voicemail message status in the memory 204. The hook status detector 214 is configured to detect whether the IP phone 200 is in an on-hook or off-hook state. In a particular embodiment, the hook status detector 214 detects that the IP phone 200 is in an off-hook state when a receiver or handset of the IP phone 200 is lifted. Upon the hook status detector 214 detecting that the IP phone 200 is in an off-hook state, the processor 202 instructs the simulated stutter dial tone generator module 208 to generate a simulated stutter dial tone signal such as described with respect to FIG. 1. The simulated stutter dial tone signal is provided to the speaker 210. After receiving the simulated stutter dial tone signal, the speaker 210 produces an audible representation of the simulated stutter dial tone signal so that a user is given an audible indication that one or more new voicemail messages are waiting in the user's voicemail box in the voicemail system 108. The keypad 220 is configured to receive input from the user, such as a command to check voicemail messages or dialing of a particular phone number, and provide the user input to the processor 202. The display 216 is configured to display phone status information, such as an indication of waiting voicemail messages to the user.

The user may later access and/or listen to the new voicemail messages at the voicemail system 108 using the IP phone 200, another telecommunication device, or through a portal. When the user accesses the new voicemail messages at the voicemail system 108, the voicemail system 108 sends a notification message to the IP phone 200 indicating that there are no new voicemail messages for the user. Upon the IP phone 200 receiving the notification message via network interface 218, the processor 202 stores the updated voicemail status information in the memory 204 indicating that there are no new messages for the user. Upon the hook status detector 214 detecting an off-hook condition, the processor 202 does not instruct the simulated stutter dial tone generator module 208 to generate a simulated stutter dial tone signal, and instead the user of the IP phone 200 is presented with a normal dial tone. In at least one embodiment, the normal dial tone is generated by the audio codec module 206. In an alternative embodiment, the normal dial tone may be generated by the simulated stutter dial tone generator module 208. In various embodiments of the IP phone 200 of FIG. 2, one or more of the simulated stutter dial tone generator module 208, the audio codec module 206, and the hook status detector 214 may be either a hardware module, a software module stored in memory, or a combination of hardware and software modules.

Figure 3:
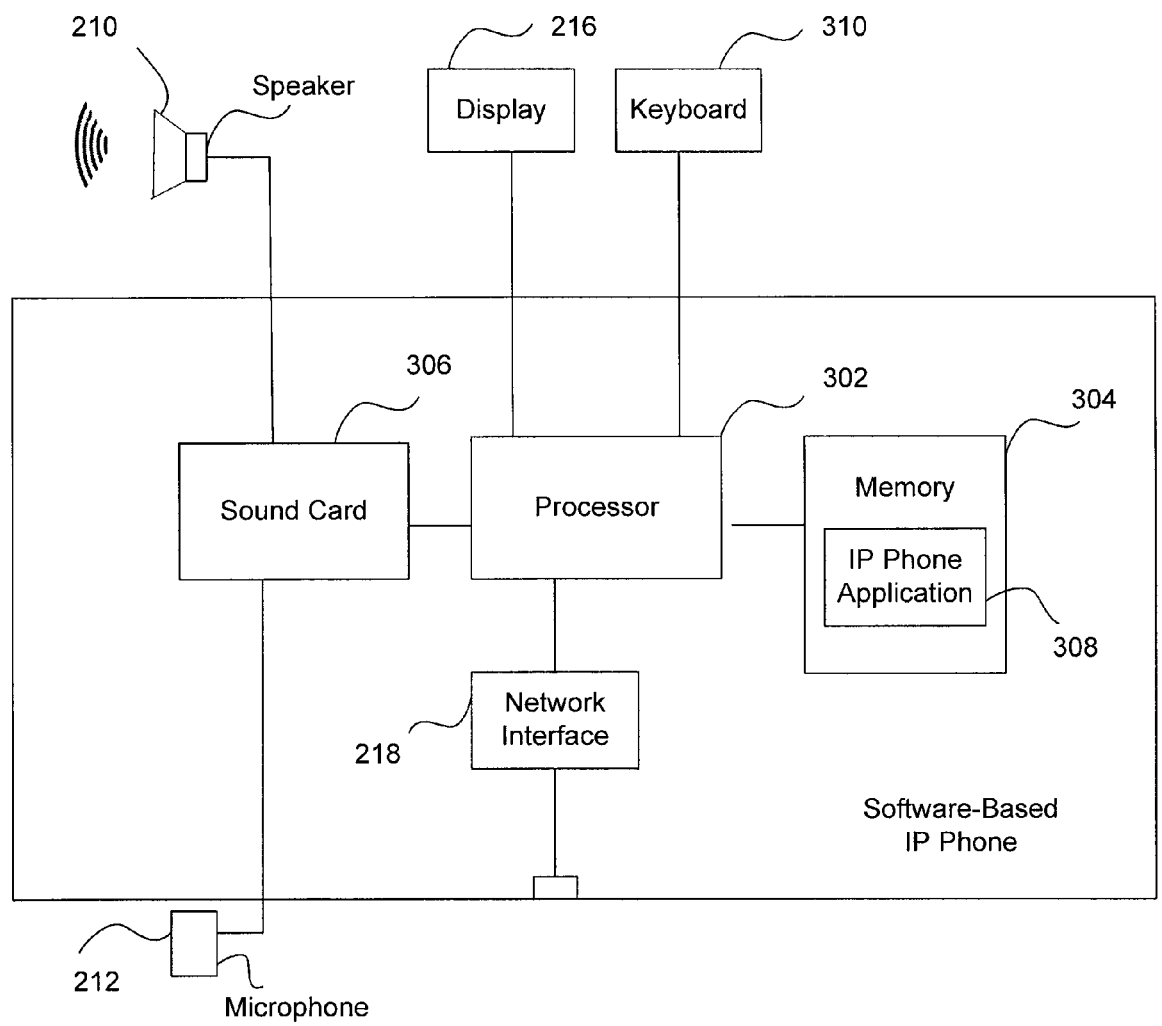
FIG. 3 is an embodiment in which the packet-based telephony device is a software-based IP phone.

FIG. 3 is an embodiment in which the packet-based telephony device 102 is a software-based IP phone 300. In at least one embodiment, the software-based IP phone 300 is a personal computer. The software-based IP phone 300 includes a processor 302, memory 304, sound card 306, speaker 210, microphone 212, display 216, a keyboard 310, and network interface 218. In at least one embodiment, the processor 302 is configured to retrieve computer-readable instructions from the memory 304 and execute the computer-readable instructions to perform various functions of the IP phone 300, as described herein. The network interface 218, speaker 210, microphone 212, and display 216 function in a similar manner as those described with respect to FIG. 2. In at least one embodiment, the sound card 306 functions in a similar manner as the audio codec module 206 of FIG. 2.

In the illustrated embodiment of FIG. 3, the memory 304 further includes an IP phone application 308. In at least one embodiment, the IP phone application 308 performs the functions of the simulated stutter dial tone generator module 208, hook status detector 214, and other IP telephony functions as described with respect to FIG. 2 when executed by the processor 302. In at least one embodiment, the IP phone application 308 is a computer usable program product in a computer-readable medium storing computer executable instructions. In at least one embodiment, the software-based IP phone 300 receives notification messages from the voicemail system 108, generates a simulated stutter dial tone signal, provides the simulated stutter dial tone signal to the speaker 210 in a similar manner as described with respect to FIG. 2. In at least one embodiment, the IP phone 300 may further display a message waiting indication in the display 310 to indicate that a new voicemail message is waiting for the user. In an alternative embodiment, if the speaker 210 or other audio reproduction device has been placed in a muted state such that the stutter dial tone may not be heard by the user, the IP phone 300 may be configured to display a message waiting indication using the display 216. The message waiting indication provides a visual indication that the new message is waiting the voicemail box. In a particular embodiment, the IP phone 300 may display the message waiting indication via a pop-up window in the display 216 indicating that one or more new messages are waiting in the voicemail box. In an alternative embodiment, the audio coding and decoding functions of the sound card 306 may be performed by the processor 302. In still other embodiments, the IP phone application 308 may be implemented using a combination of hardware and software modules.

Figure 4:
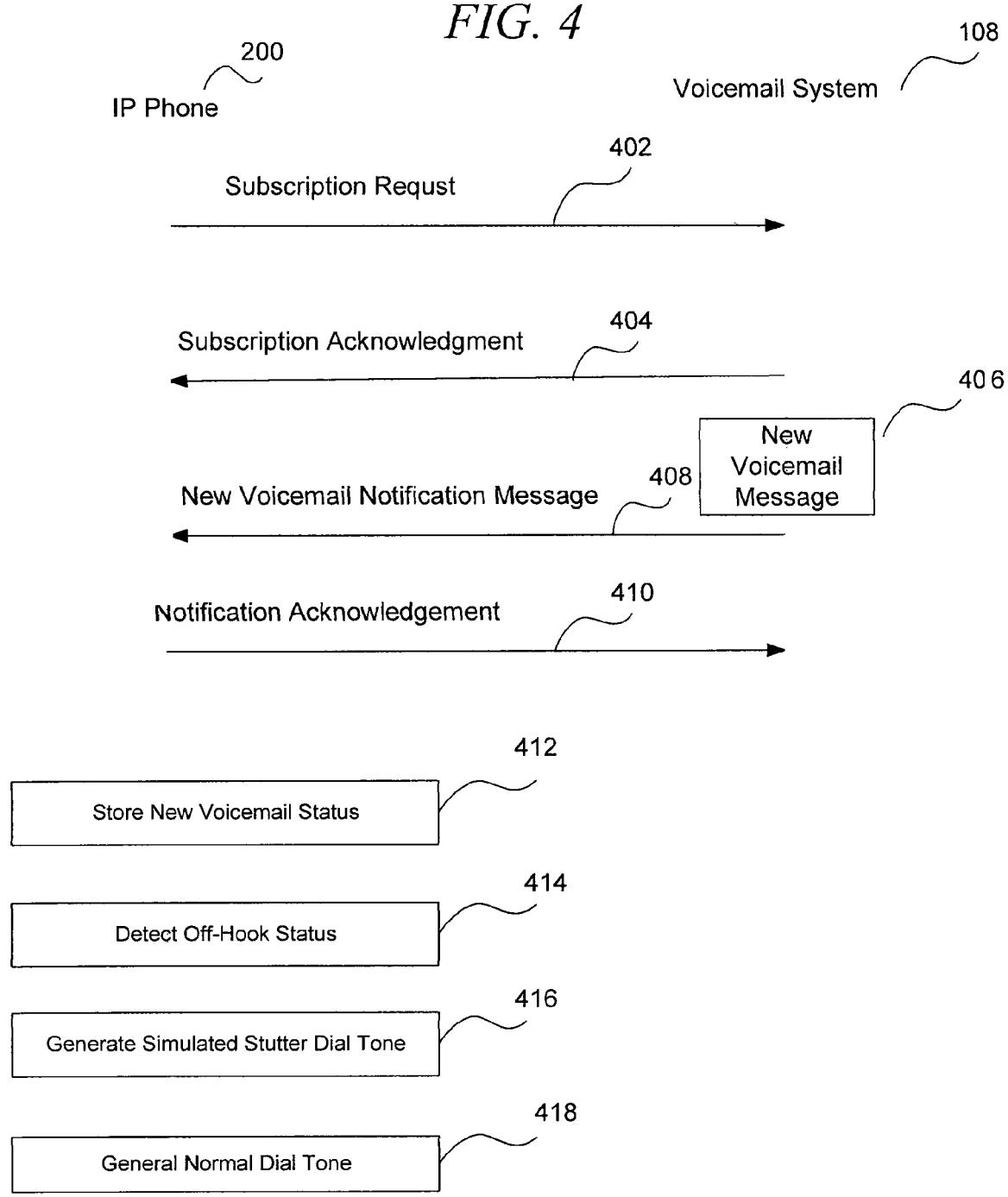
FIG. 4 is an embodiment of a procedure for providing a simulated stutter dial tone. In a particular embodiment, a session initiation protocol (SIP) is used to transmit messages between the IP phone and the voicemail system.

FIG. 4 is an embodiment of a procedure 400 for providing a simulated stutter dial tone. In a particular embodiment, a Session Initiation Protocol (SIP) such as described in RFC 3842 is used to transmit message waiting notification messages between the IP phone 200 and the voicemail system 108. In step 402, the IP phone 200 sends a subscription request to the voicemail system 108. The subscription request indicates to the voicemail system 108 that the IP phone 200 wishes to receive status information of a voicemail box associated with a user of the IP phone 200 maintained by the voicemail system 108. In step 404, the voicemail system 108 sends a subscription acknowledgment to the IP phone 200. The subscription acknowledgment indicates to the IP phone 200 that the voicemail system 108 will send voicemail box status information to the IP phone 200. In step 406, the voicemail system 108 receives a new voicemail message in the voicemail box associated with the user of the IP phone 200. In one embodiment, the calling party device 110 places a call to the IP phone 200 that is not answered within a predetermined number of rings. The call is forwarded to the voicemail system 108. In another embodiment, a call placed to the IP phone 200 by the calling party device 110 receives a busy signal, and the call is then forwarded to the voicemail system 108. In such embodiments, the caller using the calling party device 110 is prompted to leave a voicemail message for the user of the IP phone 200, the voicemail message is recorded by the voicemail system 108, and the voicemail system 108 stores the voicemail message in the voicemail box associated with the user of the IP phone 200. In another embodiment, the calling party may forward or place a voicemail message in the user's voicemail box directly using the voicemail system 108 without first placing a call to the IP phone 200.

In response to receiving the new voicemail message, the voicemail system 108 sends a new voicemail notification message to the IP phone 200 in step 408. The new voicemail notification message indicates that one or more new voicemail messages is waiting in the voicemail box associated with the user of the IP phone 200. In step 412, the IP phone 200 stores the new voicemail status in the memory 204. In step 414, the IP phone 200 detects an off-hook status of the IP phone 200. In at least one embodiment, the off-hook status is initiated by a user of the IP phone 200 lifting a handset of the IP phone 200 from a cradle. In step 416, the IP phone 200 generates a simulated stutter dial tone signal in response to receiving the new voicemail notification message and detecting the off-hook status. The simulated stutter dial tone signal is provided to an audio reproduction device, such as the speaker 210. The simulated stutter dial tone signal is generated for a predetermined time period after detection of the off-hook status of the IP phone 200. In a particular embodiment, after the predetermined time period has elapsed, the IP phone 200 generates a normal dial tone in a step 418, and provides the normal dial tone to the speaker 210. In one embodiment, the IP phone 200 generates the normal dial tone until an on-hook status is detected by the hook status detector 214. In a particular embodiment, the on-hook status is detected when the user places the handset back on the cradle.

Figure 5:
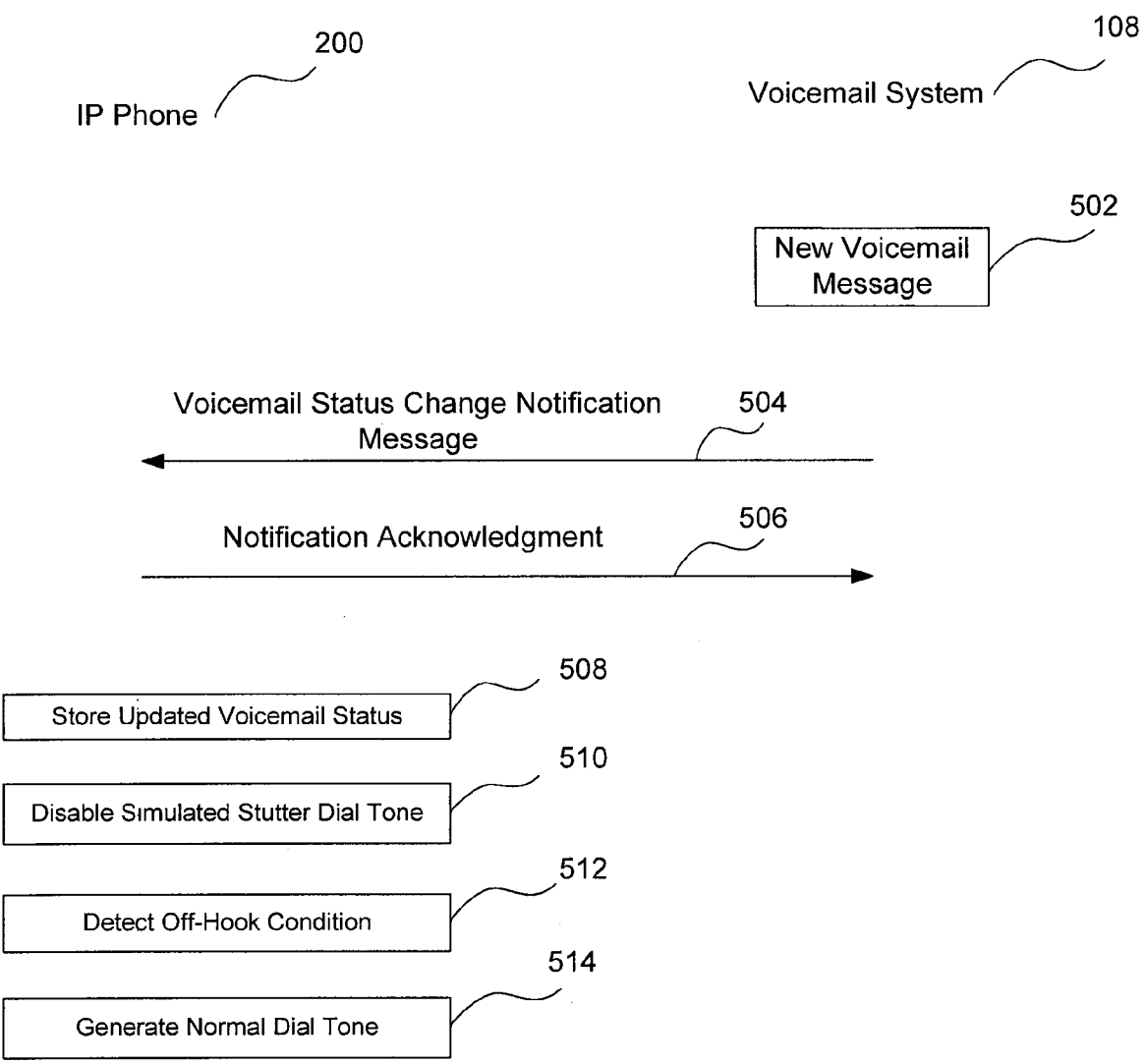
FIG. 5 is an embodiment of a procedure for inhibiting the simulated stutter dial tone when no new voicemail messages are waiting for the user.

FIG. 5 is an embodiment of a procedure 500 for inhibiting the simulated stutter dial tone when no new voicemail messages are waiting for the user. In step 502, the user of the IP phone 200 accesses the voicemail box associated with the user in a voicemail system 108. Upon the user listening to or deleting the new voicemail message in the voicemail box, the voicemail system 108 sends a voicemail status change notification message to the IP phone 200 in step 504. In step 506, the IP phone 200 sends a notification acknowledgment to the voicemail system 108 indicating reception of the voicemail status change notification message. The voicemail status change notification message indicates that there are no new voicemail messages in the voicemail box associated with the user. In step 508, the IP phone 200 stores the updated voicemail status information in the memory 204. The updated voicemail status information indicates that there are no new messages waiting for the user in the user's voicemail box. In response to receiving the voicemail status change notification message indicating that no new voicemail messages are waiting in the user's voicemail box, the IP phone 200 disables the simulated stutter dial tone signal. In step 512, the IP phone 200 detects an off-hook status of the IP phone 200. In step 514, the IP phone 200 generates a normal dial tone providing an audible indication to the user that no new voicemail messages are waiting for the user in the user's voicemail box. In one embodiment, the IP phone 200 generates the normal dial tone until an on-hook status is detected by the hook status detector 214.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device. In various embodiments, the packet-based telephony device 102 includes one or more processors operable to execute computer executable instructions from a computer-usable or computer-readable medium to perform the various capabilities of the packet-based telephony device 102 described herein.

The computer-usable or computer-readable medium can be an electronic, magnetic, optical, electromagnetic, infrared, or semiconductor system (or apparatus or device) or a propagation medium. Examples of a computer-readable medium includes a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

Although some embodiments have been described with respect to IP phones, it should be understood that other embodiments may be directed to any IP endpoint device or other packet-based telephony device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for providing a simulated stutter dial tone comprising:
    receiving a new voicemail notification message at a packet-based telephony device, the new voicemail notification message indicating that a new voicemail message is waiting in a voicemail box associated with a user of the packet-based telephony device;
    determining whether the received new voicemail notification message includes a stutter dial tone signal;
    detecting an off-hook status of the packet-based telephony device;
    in response to a determination that the received new voicemail notification message does not include a stutter dial tone signal, generating a simulated stutter dial tone signal by the packet-based telephony device; and
    providing the simulated stutter dial tone signal to an audio reproduction device.

2. The method of claim 1, wherein the simulated stutter dial tone signal is generated for a predetermined time period after detecting the off-hook status of the packet-based telephony device.

3. The method of claim 1 further comprising:
    displaying a message waiting indication if the audio reproduction device is in a muted state, the message waiting indication providing a visual indication that the new message is waiting the voicemail box.

4. The method of claim 1 further comprising:
    receiving a voicemail status change notification message at the packet-based telephony device, the voicemail status change notification message indicating that no new voicemail messages are waiting in the voicemail box;
    detecting an off-hook status of the packet-based telephony device; and
    generating a normal dial tone in response to receiving the voicemail status change notification message and detecting the off-hook status of the packet-based telephony device.

5. The method of claim 1, wherein the simulated stutter dial tone signal includes a first tone having a frequency of approximately 350 Hz and a second tone having a frequency of approximately 440 Hz.

6. The method of claim 5, wherein each of the first tone and the second tone have a signal power of at least −20 dBm.

7. The method of claim 1, wherein the simulated stutter dial tone signal has a cadence timing of approximately 120 ms.

8. The method of claim 1, wherein the simulated stutter dial tone signal is generated for at least five on/off cycles after detecting the off-hook status.

9. The method of claim 1, wherein the voicemail box is stored in a network voicemail system.

10. The method of claim 1, wherein the packet-based telephony device is an IP phone.

11. A packet-based telephony device comprising:
    a memory;
    at least one processor, the at least one processor configured to retrieve computer-readable instructions from the memory and execute the computer-readable instructions so as to receive a new voicemail notification message at a packet-based telephony device, the new voicemail notification message indicating that a new voicemail message is waiting in a voicemail box associated with a user of the packet-based telephony device, and so as to determine whether the received new voicemail notification message includes a stutter dial tone signal;
    a hook status detector configured to detect an off-hook status of the packet-based telephony device;
    a simulated stutter dial tone generator module configured to generate a simulated stutter dial tone signal in response to a determination that the received new voicemail notification message does not include a stutter tone signal and the detecting the off-hook status; and
    an audio reproduction device configured to receive the simulated stutter dial tone signal.

12. The packet-based telephony device of claim 11, wherein the simulated stutter dial tone generator module is configured to generate the simulated stutter dial tone signal for a predetermined time period after the detection of the off-hook status of the packet-based telephony device.

13. The packet-based telephony device of claim 11, further comprising:
    a display configured to display a message waiting indication if the audio reproduction device is in a muted state, the message waiting indication providing a visual indication that the new message is waiting the voicemail box.

14. The packet-based telephony device of claim 13, wherein the message waiting indication is a pop-up window indicating that one or more new messages are waiting in the voicemail box.

15. The packet-based telephony device of claim 11, wherein the simulated stutter dial tone signal includes a first tone having a frequency of approximately 350 Hz and a second tone having a frequency of approximately 440 Hz.

16. The packet-based telephony device of claim 15, wherein each of the first tone and the second tone have a signal power of at least −20 dBm.

17. The packet-based telephony device of claim 11, wherein the simulated stutter dial tone signal has a cadence timing of approximately 120 ms.

18. The packet-based telephony device of claim 11, wherein the voicemail box is a network voice mail system.

19. The packet-based telephony device of claim 11, wherein the packet-based telephony device is an IP phone.

20. A non-transitory computer-readable medium storing computer executable instructions that, when executed, cause at least one processor to:
    receive a new voicemail notification message at a packet-based telephony device, the new voicemail notification message indicating that a new voicemail message is waiting in a voicemail box associated with a user of the packet-based telephony device;
    determine whether the received new voicemail notification message includes a stutter dial tone signal;
    detect an off-hook status of the packet-based telephony device;
    generate a simulated stutter dial tone signal in response to a determination that the received new voicemail notification message does not include a stutter tone signal and detecting the off-hook status;
    provide the simulated stutter dial tone signal to an audio reproduction device.

* * * * *